United States Patent
Smith, Jr. et al.

(10) Patent No.: US 7,625,536 B2
(45) Date of Patent: Dec. 1, 2009

(54) TITANIFEROUS ORE BENEFICIATION

(75) Inventors: Earl M. Smith, Jr., Severna Park, MD (US); Andrea de Castro Sheldon, Glen Burnie, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 619 days.

(21) Appl. No.: 11/252,407

(22) Filed: Oct. 18, 2005

(65) Prior Publication Data

US 2007/0092416 A1    Apr. 26, 2007

(51) Int. Cl.
*C01G 23/00* (2006.01)

(52) U.S. Cl. .......................................... 423/81; 423/82
(58) Field of Classification Search ............ 423/81, 423/82
See application file for complete search history.

(56) References Cited

U.S. PATENT DOCUMENTS

| | | | |
|---|---|---|---|
| 2,811,434 A | 10/1957 | Möklebust et al. | 75/30 |
| 3,777,013 A | 12/1973 | Soverini et al. | 423/610 |
| 3,784,670 A | 1/1974 | Yamada et al. | |
| 4,176,159 A * | 11/1979 | Paixao et al. | 423/80 |
| 5,011,666 A | 4/1991 | Chao et al. | 423/82 |
| 5,085,837 A | 2/1992 | Chao et al. | 423/82 |
| 5,181,956 A | 1/1993 | Chao | 75/743 |
| 5,730,774 A * | 3/1998 | Hollitt et al. | 75/419 |
| 5,826,162 A | 10/1998 | Aral et al. | 423/20 |
| 5,830,420 A * | 11/1998 | Borowiec et al. | 423/69 |
| 6,048,505 A | 4/2000 | Miller et al. | 423/82 |
| 6,803,024 B1 * | 10/2004 | Van Dyk et al. | 423/69 |
| 7,008,602 B2 * | 3/2006 | Smith et al. | 423/82 |
| 2001/0051120 A1 * | 12/2001 | De Matos et al. | 423/84 |
| 2002/0168310 A1 | 11/2002 | McClelland et al. | |
| 2003/0198591 A1 * | 10/2003 | Smith et al. | 423/610 |

FOREIGN PATENT DOCUMENTS

| | | |
|---|---|---|
| CA | 1234990 | 4/1988 |
| EP | 0 243 725 A2 | 11/1987 |
| WO | WO 91/13180 A | 9/1991 |
| WO | WO/92/20827 A | 11/1992 |
| WO | WO/95/24510 A | 9/1995 |
| WO | WO/2005/042405 A | 5/2005 |

OTHER PUBLICATIONS

PCT Search Report dated Jun. 15, 2007.

* cited by examiner

*Primary Examiner*—Steven Bos
(74) *Attorney, Agent, or Firm*—Dunlap Codding, P.C.

(57) ABSTRACT

This invention relates to a process for beneficiating a titaniferous ore. The process comprises leaching the titaniferous ore with sulfuric acid to form a leached ore, calcining the leached ore in the presence of oxygen to form a calcined ore, and leaching the calcined ore with sulfuric acid, hydrochloric acid, and/or nitric acid to form a beneficiated ore. The leached ore is not reduced prior to or following calcination.

16 Claims, No Drawings

_US 7,625,536 B2_

TITANIFEROUS ORE BENEFICIATION

FIELD OF THE INVENTION

This invention relates to a process for beneficiating a titaniferous ore. The process comprises leaching the titaniferous ore with sulfuric acid to form a leached ore, calcining the leached ore in the presence of oxygen to form a calcined ore, and leaching the calcined ore with sulfuric acid, hydrochloric acid, and/or nitric acid to form a beneficiated ore. The leached ore is not reduced prior to or following calcination.

BACKGROUND OF THE INVENTION

Titanium dioxide ($TiO_2$) is commercially produced by either the sulfate process or the chloride process. In the chloride process, titania-containing feedstocks are chlorinated to form titanium tetrachloride which is then oxidized to form $TiO_2$. This process operates most efficiently starting from titania-containing feedstocks having high $TiO_2$ content. Unfortunately, many titaniferous ores in their natural state, such as ilmenite, have $TiO_2$ content in the range of 40% to 65% which is undesirably low for the chloride process.

Many different beneficiation methods for improving the $TiO_2$ content of titaniferous ores have been developed. Slagging, for example, is utilized to upgrade ilmenite ores by reducing the majority of ferric and ferrous iron content to molten metallic iron in a furnace. The denser molten iron separates from the slag which floats on top of the molten iron phase. The slag contains a high percentage of $TiO_2$ along with a lesser concentration of other impurities. The high percentage $TiO_2$ slag with impurities is then separated from the molten iron and processed as a $TiO_2$ feedstock.

Because the iron co-product from the slagging process can be sold as a feedstock for steel manufacture, slagging processes are economical for ilmenites having relatively low percentages of $TiO_2$ concentrations.

However, since slagging processes are limited mostly to the separation of iron from the precursor ilmenite, significant levels of other impurities from the ilmenite feedstock can build up in the slag. Examples of such impurities are alkaline earth metals (e.g., Ca, Mg) and alkali metals (e.g., Na). Due to the high boiling points of the chloride compounds for these impurities, they can be harmful to the fluid bed chlorination process. As a result, a particular slag's impurities can relegate it to use with the less preferred sulfate process.

The Becher process is another process for upgrading ilmenite. Although the Becher process is a wet chemical process, its final product is similar to slag in that the Becher process removes iron while leaving all other non-ferrous impurities (calcium, alkali metals, etc.,) behind.

In addition to the ilmenite ores, there is an interest in developing processes from alternative ores containing relatively high levels of Is impurities that are not typically found in ilmenite. The removal and reclamation of some of these impurities could be commercially significant given the high price that some of these materials command. One such alternative ore is naturally occurring anatase $TiO_2$ that is found in Brazil. This type of ore, as well as similar anatase ore bodies including blends of anatase and ilmenite, tend to have high levels of radionuclides, alkaline earth metals, rare earth metals, phosphates, and silica, which have limited their use due to the high costs of removing these impurities from the ore.

Acid leaching processes have been taught to remove iron oxide and other impurities from titaniferous ores. See, for example, U.S. Pat. Nos. 2,811,434, 3,777,013, 5,011,666, 5,085,837, 5,181,956, 5,826,162, and 6,048,505. Canadian Pat. No. 1,234,990 teaches a beneficiation process that comprises leaching ilmenite with a mineral acid, oxidizing and then reducing this intermediate concentrate, and then leaching the reduced intermediate to upgrade ilmenite.

There is a need to develop processes for removing impurities from ores, particularly those ores with high levels of non-ferrous impurities. The present invention provides such an improved process.

SUMMARY OF THE INVENTION

The invention is a process for beneficiating a titaniferous ore. The process comprises leaching the titaniferous ore with sulfuric acid to form a leached ore and a liquid phase; calcining the leached ore in the presence of oxygen to form a calcined ore, wherein the leached ore is not reduced prior to or following calcination; and leaching the calcined ore with an acid selected from the group consisting of sulfuric acid, hydrochloric acid, and nitric acid to form a beneficiated ore. The process of the invention results in significantly reduced impurity levels in the beneficiated ore.

DETAILED DESCRIPTION OF THE INVENTION

The process of the invention is a method of beneficiating titaniferous ores through the use of two leaching stages with an intermediate calcination stage. Titaniferous ores useful in the process of the invention include titania-containing ores that contain iron and other impurities. Particularly preferred ores include titaniferous ores with total alkaline earth metal concentrations of between 0.2 and 4 weight percent; titaniferous ores with radionuclide (in particular, Uranium+Thorium) concentrations between 120 ppm and 1000 ppm; titaniferous ores with rare earth metal concentrations between 0.3 and 3 weight percent; titaniferous ores with phosphate concentrations between 1 and 10 weight percent; titaniferous ores with silica concentrations between 1 and 10 weight percent; and titaniferous feedstocks with low $TiO_2$ concentrations between 40 and 75 weight percent $TiO_2$, as well as slags having between 75 and 87 weight percent $TiO_2$.

One such titaniferous ore is naturally occurring anatase $TiO_2$. In particular, anatase ore found in Brazil, as well as similar anatase ore bodies including blends of anatase and ilmenite, tend to have high levels of radionuclides, alkaline earth metals, rare earth metals, phosphates, and silica. Other types of ore include, but are not limited to slags, such as those containing high levels of calcium and magnesium, and are for example, located in Norway, Sweden, Canada, and China; tar sands, such as those that contain relatively high levels of alkaline earths and $SiO_2$ and are, for example, located in Alberta, Canada; and other types of naturally occurring titaniferous ores such as well known ilmenite deposits. Preferred titaniferous ores include anatase ore, ilmenite, and blends of anatase and ilmenite. When an anatase/ilmenite blend is used, the blend will typically contain between 70 and 90 weight percent anatase and between 30 and 10 weight percent ilmenite.

Prior to the first leaching stage, the titaniferous ore may be subjected to a thermal or chemical pretreatment. For example, the titaniferous ore may be pretreated by oxidizing the ore to form an oxidized ore and then reducing the oxidized ore. The oxidation step may be performed in the presence of an oxygen-containing gas, such as air, at elevated temperature. Preferably, the oxidation temperature is greater than 250° C., most preferably greater than 400° C. The reduction step may be performed in the presence of a reductant, preferably hydrogen, at elevated temperature. Preferably, the reduction temperature is greater than 50° C., most preferably greater than 150° C. In the case of ilmenite, the ilmenite may be oxidized to form a pseudobrookite-based material and then reduced prior to the first leaching stage. An example of this process is described in commonly owned patent application, Ser. No. 10/126,241, filed Apr. 19, 2002, published as U.S. 2003/0198591, Oct. 23, 2003. Following the oxidation/reduction pretreatment, substantially all of the ore's iron is in the +2 oxidation state. Preferably, the oxidation/reduction pretreatment results in virtually no remaining iron in the +3 oxidation state and only up to 1 weight percent metallic iron.

In addition to an oxidation/reduction pretreatment, the titaniferous ore may also be pretreated prior to first stage leaching by reducing the titaniferous ore to form a reduced ore, and then subjecting the reduced ore to magnetic separation and/or to mild oxidation. An example of this procedure is described in EP 0 243 725 A2. Iron removal may be improved by the initial reduction step. The reduction step may be performed in the presence of a reductant, such as hydrogen, at elevated temperature. Preferably, the reduction temperature is greater than 50° C., most preferably greater than 150° C. The reduced ore may then be subjected to magnetic separation and/or to mild oxidation. Magnetic separation may be performed at approximately 500 gauss to 20,000 gauss. The magnetic separation step is useful to remove solid phase reductants, e.g., coal char, etc. The mild oxidation may be performed in the presence of an oxygen-containing gas, such as air, at mild temperature. Preferably, the oxidation temperature is less than 600° C., more preferably less than 500° C.

Although the titaniferous ore may be pretreated prior to the first leaching stage, it is often preferable that the titaniferous ore is not subjected to a thermal or chemical treatment prior to leaching. In fact, both anatase and an anatase/ilmenite blend have been found to leach most impurities better with no pretreatment. Further, although iron removal is better when the ore is pretreated by a reduction step, the improvement in iron removal from these types of ores is not commercially significant compared to the radionuclide, alkaline earth and phosphates removal and the rare earth metals removal. In fact, the iron removal from non-pretreated anatase based ores is surprisingly efficient given the high ferric content.

In the first leaching stage, the titaniferous ore is leached with sulfuric acid to form a leached ore and a liquid phase. Any source of sulfuric acid may be used in the leaching step. However, the sulfuric acid is more preferably virgin, waste and/or recycled sulfuric acid. The sulfuric acid concentration is preferably in the range of from 5 to 65 weight percent $H_2SO_4$.

The leach can occur at either ambient or elevated pressure. Preferably, the titaniferous ore is leached by contacting the ore with sulfuric acid at elevated pressure of at least 10 psig, more preferably at least 20 psig and most preferably at least 30 psig. As persons skilled in the art are aware, when conducting a leaching process, the pressure is dependent on the temperature and the concentration of the acid involved. In order to increase the pressure, one may increase the temperature and/or decrease the acid concentration.

The leach can occur at either ambient or elevated temperature. Preferably, the titaniferous ore is leached by contacting the ore at a temperature of at least 110° C. The leaching preferably occurs for a reaction time from 10 minutes to 5 hours. The anhydrous acid/ore weight ratio preferably exceeds 0.5. An anhydrous acid/ore ratio is a weight-based ratio that describes the amount of acid by weight (not the amount of solution in which the acid is dissolved) in relationship to the amount of ore.

The product of the first leaching step is a first liquid phase and a first leached ore. Within the first liquid phase, there will be fines that form as a first solid phase in solution. The fines are composed of: (i) hydrolysate $TiO_2$, typically comprising $TiO(OH)_2$ and other forms of hydrated (or sulfated) $TiO_2$, that is formed via the dissolution of beneficiate $TiO_2$ from the beneficiate and subsequently precipitated in solution as hydrolysate; (ii) metallic salts of those impurities leached from the ore that have reached their saturation concentrations in solution and subsequently formed precipitates; and (iii) metallic hydrates such as metallic hydroxides of those impurities leached from the ore. One of the surprising aspects of the process is the number of impurities that have been found to leach with sulfuric acid from the anatase based ore.

The leached ore is preferably separated from the fines and mother liquor through a separation and washing process (preferably conducted in the presence of water and/or dilute washings from other process steps). Methods for separating leached ore from mother liquors and fines are well known to persons skilled in the art and include but are not limited to the use of hydrocyclones. After separation, the coarse leached ore may be washed to remove soluble impurities prior to the calcination step. Excess washings can be sent to either neutralization or recycled to other parts of the process.

The mixture of fines and mother liquor may be sent to a separation process in which one can remove the fines from the mother liquor. Filtration or settling are possible separation options, but other techniques that are now known by or that come to be known by persons of ordinary skill in the art, may be used. The fines can be sent to a process similar to that described in U.S. Pat. No. 2003/0198591, the teachings of which are herein incorporated by reference, which describes the separation of $TiO_2$ fines separated from soluble metallic salts following leaching of ilmenite.

Due to the type and level of rare and alkaline earth metals present in some titaniferous ores, including anatase ore, the processing of the above fines may require additional processing steps (e.g., digestion of $TiO_2$) to remove the $TiO_2$ from the impurities. For instance, the hydrolysate $TiO_2$ and metal sulfates may be subjected to a wash liquid to dissolve metal sulfates and produce washed hydrolysate $TiO_2$. The washed hydrolysate can be used "as is" or digested in acid downstream to further separate the $TiO_2$ content from the undigestable impurities.

The above mother liquor may be referred to as a "first mother liquor" and comprises sulfuric acid, as well as certain other impurities such as metallic salts. This first mother liquor may be subjected to any form of crystallization step, including crystallization by cooling or vacuum evaporation/crystallization, etc. to remove metallic salts from that mother liquor and to reconcentrate the acid. This acid may be subjected to a reductant and then recycled to the first leaching stage. Additionally, makeup virgin acid is preferably added at crystallization to assist with the crystallization via "salting out" of the above metallic salts.

The above recycle acid contains both ferric and ferrous iron sulfates. By reducing the ferric iron to ferrous in the above recycle stream, subsequent leaching of radionuclides is potentially improved beyond prior art methods. By further addition of a reducing agent to the leach, e.g., by adding $Ti^{+3}$ to the recycle stream, the removal of radionuclides is further enhanced beyond prior art methods. Reduction of the ferric sulfates to ferrous sulfates can also be accomplished via metallic iron addition, electrolytically, or any other method now known or that comes to be known by persons of ordinary skill in the art. The amount of reductant to add is determined primarily by the amount of ferric iron in the recycle acid.

Enough reductant must be added to convert all ferric iron to ferrous iron and to convert a significant amount (if not all) of any remaining solubilized $Ti^{+4}$ to $Ti^{+3}$ in the recycle stream.

Similar to the above modifications to the acid recycle stream, improved removal of radionuclides is preferably accomplished during the first sulfuric acid leach by creating reducing conditions via metallic iron addition, $Ti^{+3}$ addition, electrochemically, or via any other method known to the art. The amount of reductant to add is determined by conversion of solubilized ferric iron to ferrous and by having a $Ti^{+3}$ presence during the leach to create reducing conditions favorable to the leaching of thorium.

The above-described leached ore is preferably washed and dried prior to calcination. In the calcination stage, the leached ore is calcined in the presence of oxygen to form a calcined ore, wherein the leached ore is not reduced prior to or following calcination. The leached ore is calcined in the presence of an oxygen-containing gas (including air, pure oxygen, and oxygen in nitrogen or other such gases), preferably at a temperature greater than 800° C. More preferably, the leached ore is calcined at a temperature between 900° C. and 1100° C. Typically, the leached ore is heated at the calcination temperature for a time greater than 0.5 hour.

Preferably, the leached ore is calcined in such a way that the temperature profile is manipulated during the calcination process. The temperature manipulation is conducted by preferably heating at a first temperature greater than 800° C., and then rapidly increasing the temperature profile to a second temperature at the very end of the calcination for a time preferably less than 0.5 hour.

Manipulation of temperature profiles during the calcination step may further improve the leaching of impurities. Compounds that are calcined for long periods of time may tend to anneal and to gain a more uniform crystalline structure/morphology, thereby causing them to be more difficult to leach. Variation of the calcination temperature profiles may disrupt the crystal structure/morphology and increase the level of crystalline defects, amorphous phases, and fissures in the particles. Such disruptions may significantly enhance the removal of impurities if all other factors are equal. One example of temperature manipulation during calcination is bringing the temperature of a sample to 950° C. and holding it constant for 30 minutes followed by a brief temperature increase to 1000° C. for an additional 10 minutes before cooling. An example of post-calcination temperature profile manipulation is the slow cooling of the material by slowly ramping down the temperature settings on the furnace.

Minor increases at the end of the temperature profile, e.g., 30 minutes at an initial temperature between 900° C. to 1050° C., followed by 30 minutes at a temperature 50° C. higher, results in significant improvements to radionuclide leaching results. Note that the above temperatures are furnace setpoint temperatures. Depending upon conditions, the actual temperature of the ore will lag the furnace setpoints by roughly 5 to 25 minutes.

In addition to temperature manipulation, it is also preferable to combine the leached ore with at least one chemical additive prior to the calcining step. In many cases, providing chemical additives to the leached ore prior to calcination allows even greater removal of impurities by reacting with the impurities in the ore to provide compounds that are more soluble during the subsequent leaching step.

The chemical additives typically react with the above impurities to form soluble oxides or salts. Examples of chemical additives useful in the process include, but are not limited to, $NaCl$, $NaOH$, $Na_2CO_3$, $KCl$, $KOH$ and $K_2CO_3$, as well as other salts of alkali metals, and mixtures of the aforementioned compounds. The chemical additives are preferably added as an aqueous solution to the leached ore, in order to ensure penetration into the ore particles. A calcined ore that is mixed with chemical additive is preferably dried prior to calcination. For instance, it is possible to dry the material in the low temperature section of a commercial rotary calciner, prior to calcination in the high temperature section of the kiln.

The amount of chemical additives combined with leached ore may be determined empirically, but is essentially a ratio of the total cationic charges of selected impurities in the ore to the total cationic charges of the added salt. Depending upon the level of impurities, the added salt weight is typically from 0.1 to 15 weight percent of the ore weight. In some instances, the addition of too much alkaline salt may result in the formation of alkali metal titanates which can be harmful to the product's subsequent chlorination process performance.

Following the calcination step, the leached ore is preferably contacted with water. The use of a water contact step after calcination and prior to the second stage leaching may significantly improve the overall removal of impurities. The water contact step may be performed by any manner of contacting the calcined ore with water. For instance, the calcined ore may be washed with water following calcination or the calcined ore may be directly discharged into water immediately following calcination. The use of the wash contact step after calcination is also preferable because of the desirability of removing soluble salts such as sodium salts from the ore prior to the second stage leach step. Sodium buildup works counter to acid recycle because it requires a high level of bleed from the recycle stream. Removal of sodium prior to the second stage leach minimizes the acid recycle bleed stream and thus improves the process economics.

In one embodiment, the ore discharged from calcination is cooled and washed in water or dilute acid washings from other parts of the leaching process. In another embodiment, the ore discharged from calcination is directly contacted (i.e., without a prior cooling step) with water or dilute acid washings from other parts of the leaching process. The use of a water contact step produces step change improvements to the second stage leach results for the following impurities: (i) radionuclides (U+Th); (ii) alkaline earth metals; (iii) rare earth metals; (iv) total phosphates content; and (v) $SiO_2$. Following the water contact, the contact liquors are typically separated from the calcined ore and sent to neutralization.

Following the calcination stage, the calcined ore is leached with sulfuric acid, hydrochloric acid, and/or nitric acid to form a beneficiated ore. Sulfuric acid and hydrochloric acid are preferred. Hydrochloric acid has advantages due to its presence as a reducing acid relative to the first stage sulfuric leach and its higher level of solubility for alkaline earth metals. Sulfuric acid has the advantage that waste liquors can be recycled to the first stage leach acid recycle system, provided alkali metal contamination to the second stage leach is kept to a minimum. Nitric acid may be the preferred leaching agent where highly oxidizing conditions are favorable to impurities removal, and where the improved impurities removal outweighs the higher cost of the $HNO_3$.

The second stage leach can occur at either ambient or elevated pressure. When sulfuric acid is used as the leaching agent, the titaniferous ore is preferably leached by contacting the ore with sulfuric acid at elevated pressure of at least 10 psig, more preferably at least 20 psig, and most preferably at least 30 psig. As persons skilled in the art are aware, when conducting a leaching process, the pressure is dependent on the temperature and the concentration of the acid involved. In order to increase the pressure, one may increase the temperature and/or decrease the acid concentration. When hydrochloric acid is used as the leaching agent, the titaniferous ore is preferably leached by contacting the ore with hydrochloric acid at ambient pressure.

The second stage leach can occur at either ambient or elevated temperature. Preferably, the titaniferous ore is leached by contacting the ore at a temperature of at least 110° C. The leaching preferably occurs for a reaction time from 10 minutes to 5 hours.

When the acid is hydrochloric acid, preferably at least one, more preferably more than one, and most preferably all, of the following process conditions are employed: (1) HCl concentration between 10-32 weight percent; (2) 10 minutes to 5 hours residence time; and (3) anhydrous acid/ore ratio greater than 0.3.

Similarly, when sulfuric acid is the leaching agent, the second stage leaching is conducted using preferably at least one, more preferably more than one, and most preferably all, of the following process conditions for consideration are employed: (1) $H_2SO_4$ concentration of 5-75 weight percent (5-70 wt. % if run at elevated temperature and pressure); (2) 10 minutes to 5 hours residence time; and (3) anhydrous acid/ore ratio greater than 0.3.

Additionally, the second stage leaching may take place in the presence of additional agents, such as NaF or $HNO_3$, that facilitate the removal of undesirable impurities. Although this option is not considered necessary for commercial operation, small quantities of NaF can be added to the second stage leach step to further improve radionuclides, iron, and aluminum removal. Similarly, small quantities of $HNO_3$ can be added to aid in the removal of uranium. If NaF is used, preferably it is an amount of up to 10 weight percent based on the weight of the ore, more preferably up to 5 weight percent, and most preferably up to 0.5 weight percent. Radionuclide removal is also improved, but the effect is slight. Other soluble alkali fluorides such as KF and LiF, as well as HF can be used instead of NaF. Further, mixtures of any of these substances can be used.

A small amount of fines is generated during the second stage leach. Similar to the first stage leach, the fines are made up primarily of hydrolysate $TiO_2$ and metallic salts.

After the second stage leach, the mixture of coarse leached ore, fines, and mother liquor may be subjected to a separation step and wash step, using, e.g., water, to remove the fines and mother liquor from the coarse material. Similar to the first stage leach, any number of means known to those skilled in the art may be used for separation (e.g., hydrocyclones, etc.). Wash liquors from this stage can be sent to the first leach stage wash or wash stage following calcination to minimize plant water consumption. The fines and mother liquor are separated via filtration, settling, or any other acceptable means known to those skilled in the art. The mother liquor from this stage may be referred to as a "second mother liquor."

The above fines can be sent to a process similar to that employed to purify the fines from the first stage leach. Thus, the second liquid phase may be subjected to separation and reslurry to separate the mother liquor, which contains acid, from hydrolysate $TiO_2$ and metallic salts. The fines can be washed by being subjected to a wash liquid, and the hydrolysate separated from the soluble metallic salts.

Due to the high level of rare and alkaline earth metals present in the anatase ore, the processing of the above fines may require additional processing steps (e.g., digestion of $TiO_2$) to remove the $TiO_2$ from the impurities.

Virgin acid may be added to the mother liquor from the fines separation and the replenished solution may be recycled to the second stage leach. Acid makeup is relatively small due to the polishing nature of the second stage leach. A bleed stream can be taken off prior to acid makeup and sent to neutralization or acid regeneration, if needed.

The above recycle acid contains both ferric and ferrous iron salts. As discussed above, further addition of a reducing agent to the leach, e.g., by adding $Ti^{+3}$ to the recycle stream, may increase the removal of radionuclides.

The beneficiated ore is preferably dried prior to shipping. It is preferred to calcine the beneficiated ore product in the presence of air and heat to remove bound water and to break down residual salts and acids, thereby generating the final synthetic rutile.

The above synthetic rutile can then be used as a feed to fluid bed chlorinators. The co-product fines can be used as feedstock to a sulfate pigment plant or catalyst process. Should metallic salts other than those that are titanium based become concentrated in the acid recycle or bleed stream, then there could be opportunities for selective precipitation or crystallization of the more valuable metallic salts.

The following examples merely illustrate the invention. Those skilled in the art will recognize many variations that are within the spirit of the invention and scope of the claims.

The Examples use either anatase or a blend of anatase and ilmenite (containing 80% anatase and 20% ilmenite). The analysis of the contents of these ores are found in Table 1.

EXAMPLE 1

$H_2SO_4$ Leach, Calcination, HCl Leach

Beneficiate 1A: Anatase (400 g) is placed in an autoclave containing an aqueous synthetic leach acid (2057 g, having a composition of 35% $H_2SO_4$ and 2.5% $FeSO_4$ to simulate residual iron sulfate from an acid recycle process). The mixture is heated under agitation for 5 hours at 160° C. and 50 psig, then depressurized and cooled, and the contents discharged from the bottom of the autoclave into an Erlenmeyer flask.

The coarse beneficiate material is separated from the fines and mother liquor by decantation, further purified by washing and decanting residual fines and mother liquor, and is finally washed and filtered on a Buchner funnel. The washed coarse beneficiate is dried overnight at 105° C. in an oven and collected (220.5 g) to result in Beneficiate 1A.

Beneficiate 1B: Beneficiate 1A (20 g) is calcined in air at 950° C. for one hour and is then leached in boiling HCl (20%, 100 g) under reflux for 5 hours before cooling. The coarse beneficiate material is decanted, filtered and dried as described for 1A, and collected (18.4 g) to result in Beneficiate 1B. The material is calcined at 900° C.

Beneficiate 1C: Beneficiate 1A (20.0 g) is mixed with NaCl (8.0 g of a 25 wt. % aqueous solution) and allowed to dry overnight at 103° C. The mixture is then calcined at 950° C. in air for one hour. The resultant calcined material (15 g) is then leached in boiling HCl (20%, 100 g) under reflux for 5 hours before cooling. The coarse beneficiate material is decanted, filtered and dried as described for Beneficiate 1A, and collected (12.5 g) to result in Beneficiate 1C. The material is calcined at 900° C.

The results (in Table 2) show a significant increase in $TiO_2$ content with a corresponding large decrease in iron, aluminum and phosphate content for beneficiates that undergo the two stage leaching process of the invention. Use of sodium chloride as a pretreatment chemical prior to calcination dramatically reduced radionuclides, calcium, phosphates, alumina, and silica compounds.

EXAMPLE 2

Calcination Temperature Profile

Beneficiate 2A: Anatase (400 g) is placed in an autoclave containing an aqueous synthetic leach acid (1800 g, having a composition of 30% $H_2SO_4$, 3.5% $FeSO_4$, and 5.6% $Fe_2(SO_4)_3$). The mixture is heated under agitation for 5 hours at 160° C. and 50 psig, then depressurized and cooled, and the contents discharged from the bottom of the autoclave into an Erlenmeyer flask.

The coarse beneficiate material is decanted, filtered and dried as described for Beneficiate 1A, and collected to result in Beneficiate 2A.

Beneficiates 2B, 2C, and 2D: Beneficiate 2A is mixed with NaCl (25 wt. % aqueous solution) in a 10% ratio of anhydrous salt/beneficiate and allowed to dry overnight at 103° C. The material is then divided into separate samples and calcined in air according to the following temperature profiles: material 2B is calcined at 900° C. for 30 minutes followed by 950° C. for an additional 30 minutes; material 2C is calcined at 950° C. for 30 minutes followed by 1000° C. for an additional 30 minutes; material 2D is calcined at 950° C. for one hour.

The resultant calcined materials (typically 18 g) are then separately leached in boiling HCl (20%, 100 g) under reflux for 5 hours before cooling. The coarse beneficiate materials are decanted, filtered and dried as described for Beneficiate 1A, and collected to give Beneficiates 2B, 2C, and 2D. These materials are calcined at 900° C.

A similar set of experiments was performed with the anatase-ilmenite feedstock, to produce Beneficiates 2E (produced in the same manner as 2A), 2F (made in the same manner as 2B), 2G (produced in the same manner as 2C), and 2H (produced in the same manner as 2D).

The results (Table 3) demonstrate significant improvement in the leachability of uranium, thorium, and rare earths for Beneficiates 2B, 2C, 2F, and 2G which underwent temperature profile manipulation, compared to Beneficiates 2D and 2H which maintained a stable calcination temperature.

EXAMPLE 3

Effect of Wash Step Following Calcination

Beneficiate 3: Anatase/ilmenite ore blend (350 g) is placed in an autoclave containing an aqueous synthetic leach acid (2100 g, having a composition of 35% $H_2SO_4$, 3.2% $Fe_2(SO_4)_3$, and 2.0% $FeSO_4$). The mixture is heated under agitation for 5 hours at 140° C. and 32 psig, then depressurized and cooled, and the contents discharged from the bottom of the autoclave into an Erlenmeyer flask. The coarse beneficiate material is decanted, filtered and dried as described for Beneficiate 1A, and collected (150 g). Five additional first stage $H_2SO_4$ leaches of anatase/ilmenite ore are made according to the above procedure. Each of the six first stage leaches are kept separate during the subsequent pretreatment:

The first stage beneficiates are then separately pretreated with a 20% solution of NaCl in an 8% ratio of anhydrous salt/beneficiate and then dried overnight at 103° C. in an oven. The materials are then calcined for 30 minutes at 975° C. and 30 minutes at 1025° C.

Three calcined samples are allowed to cool slowly after calcination, then are decantation washed (by water washing and immediately decanting) until the decantation solution is clear. The washed samples are collected on a Buchner funnel and dried overnight at 103° C. Each of the (3) washed ore batches are divided into six lots (each approximately 20 g) and then leached in 20% HCl (100 g) under reflux for five hours. The coarse material is decanted, filtered and dried as described for Beneficiate 1A, and then calcined at 900° C. in air.

The beneficiate materials (together Beneficiate 3) are separately analyzed for composition and the average composition of the beneficiate samples are shown in Table 4.

EXAMPLE 4

Second Stage Sulfuric Acid Leach

Beneficiate 4A: Anatase/ilmenite ore (300 g) is placed in an autoclave containing an aqueous synthetic leach acid (1800 g, having a composition 30% $H_2SO_4$, 3.5% $FeSO_4$, and 5.6% $Fe_2(SO_4)_3$). The mixture is heated under agitation for 5 hours at 160° C. and 50 psig, then depressurized and cooled, and the contents discharged from the bottom of the autoclave into an Erlenmeyer flask. The coarse beneficiate material is decanted, filtered and dried as described for Beneficiate 1A. The above procedure is repeated 18 times and the resulting first stage beneficiates are blended together for further use.

Beneficiate 4B: Beneficiate 4A (172 g) is pretreated with a 17.5% solution of NaOH in a 7% ratio of anhydrous hydroxide/beneficiate and allowed to dry overnight at 103° C. The material is then calcined for 30 minutes at 1050° C., followed by 30 minutes at 1100° C., then slowly cooled, and decantation washed. The sample is collected on a Buchner funnel and dried overnight at 103° C.

The washed sample (160 g) is placed in an autoclave with synthetic leach acid (1350 g, comprising 25% $H_2SO_4$, 5.0% $FeSO_4$, and 8.0% $Fe_2(SO_4)_3$). The mixture is heated under agitation for 5 hours at 140° C. and 30 psig, then depressurized and cooled, and the contents discharged from the bottom of the autoclave. The coarse material is decanted, filtered and dried as described for Beneficiate 1A, and calcined at 900° C. in air.

The results (Table 4) show a second stage sulfuric acid leach (similar to HCl second stage leach) results in dramatic reductions in radionuclides, calcium, strontium, rare earths, phosphates, manganese, vanadium, and zirconia.

Beneficiate 4C: A sample of material made identically to Beneficiate 4A (67 g) is pretreated with a 25% solution of NaCl in a 10% ratio of anhydrous chloride/beneficiate and allowed to dry overnight at 103° C. The material is then calcined for 30 minutes at 950° C., followed by 30 minutes at 1000° C., then slowly cooled.

The resultant calcined material (10 g) is then leached at atmospheric pressure in boiling $H_2SO_4$ (60.0%, 100 g) under reflux for 5 hours before cooling. The coarse material is decanted, filtered and dried as described for Beneficiate 1A, and calcined at 900° C. in air.

The results (Table 4) show an atmospheric second stage sulfuric acid leach (similar to HCl second stage leach) results in dramatic reductions in radionuclides, calcium, strontium, rare earths, phosphates, manganese, iron, and aluminum.

TABLE 1

COMPOSITION OF ORE FEEDSTOCKS

| Components | Ore Feedstock Anatase/Ilmenite | Anatase | Analytical Technique |
|---|---|---|---|
| $TiO_2$ (%) | 52.9 | 60.6 | X-ray/Uniquant |
| $Fe_2O_3$ (%) | 25.1 | 16.2 | X-ray/Uniquant |
| $Al_2O_3$ (%) | 5.9 | 6.2 | X-ray/Uniquant |

TABLE 1-continued

COMPOSITION OF ORE FEEDSTOCKS

| | Ore Feedstock | | |
|---|---|---|---|
| Components | Anatase/Ilmenite | Anatase | Analytical Technique |
| $SiO_2$ (%) | 1.51 | 1.53 | X-ray/Uniquant |
| $P_2O_5$ (%) | 6.3 | 7.4 | X-ray/Uniquant |
| MnO (%) | 0.98 | 0.71 | X-ray/Uniquant |
| $ZrO_2$ (%) | 0.67 | 0.78 | X-ray/Uniquant |
| CaO (%) | 1.24 | 1.53 | X-ray/Uniquant |
| SrO (%) | 0.60 | 0.64 | X-ray/Uniquant |
| BaO (%) | 1.15 | 0.98 | X-ray/Uniquant |
| Rare Earths (%) | 2.3 | 2.1 | X-ray/Uniquant |
| U (ppm) | 172 | 202 | Neutron Activation |
| Th (ppm) | 487 | 544 | Neutron Activation |

TABLE 2

EFFECT OF $H_2SO_4$ LEACH, CALCINATION, HCl LEACH

| Components | 1A | 1B | 1C |
|---|---|---|---|
| $TiO_2$ (%) | 88.5 | 89.8 | 93.7 |
| $Fe_2O_3$ (%) | 2.38 | 2.01 | 1.77 |
| $Al_2O_3$ (%) | 0.74 | 0.63 | 0.06 |
| $SiO_2$ (%) | 1.41 | 1.85 | 0.89 |
| $P_2O_5$ (%) | 2.32 | 1.42 | 0.18 |
| MnO (%) | 0.11 | 0.11 | 0.08 |
| $ZrO_2$ (%) | 0.82 | 0.74 | 0.82 |
| CaO (%) | 0.16 | 0.08 | 0.03 |
| SrO (%) | 0.06 | n.d. | n.d. |
| BaO (%) | 0.23 | 0.08 | 0.12 |
| Rare Earths (%) | 0.48 | 0.10 | 0.29 |
| U (ppm) | 109 | 93 | 60 |
| Th (ppm) | 176 | 104 | 91 | n.d. = not detected

TABLE 3

EFFECT OF CALCINATION TEMPERATURE PROFILE

| | Anatase | | | | Anatase/Ilmenite | | | |
|---|---|---|---|---|---|---|---|---|
| Components | 2A | 2B | 2C | 2D | 2E | 2F | 2G | 2H |
| $TiO_2$ (%) | 85.9 | 89.6 | 90.1 | 90.2 | 83.7 | 83.5 | 84.8 | 84.4 |
| $Fe_2O_3$ (%) | 5.5 | 5.2 | 5.0 | 4.9 | 6.6 | 8.87 | 7.88 | 8.27 |
| $Al_2O_3$ (%) | 0.79 | 0.45 | 0.32 | 0.26 | 1.04 | 0.58 | 0.52 | 0.41 |
| $SiO_2$ (%) | 1.56 | 0.65 | 0.77 | 0.89 | 1.62 | 1.73 | 2.18 | 2.57 |
| $P_2O_5$ (%) | 2.1 | 0.19 | 0.16 | 0.21 | 2.3 | 0.17 | 0.13 | 0.31 |
| MnO (%) | 0.2 | 0.16 | 0.14 | 0.14 | 0.25 | 0.27 | 0.23 | 0.21 |
| $ZrO_2$ (%) | 0.72 | 0.61 | 0.63 | 0.72 | 0.68 | 0.98 | 0.78 | 1.14 |
| CaO (%) | 0.16 | 0.05 | 0.05 | 0.05 | 0.22 | 0.08 | 0.05 | 0.07 |
| SrO (%) | 0.07 | n.d. | n.d. | n.d. | 0.08 | n.d. | n.d. | n.d. |
| BaO (%) | 0.24 | 0.23 | 0.24 | 0.22 | 0.25 | 0.16 | 0.16 | 0.10 |
| Rare Earths (%) | 0.56 | 0.27 | 0.33 | 0.44 | 0.76 | 0.20 | 0.21 | 0.43 |
| U (ppm) | 95 | 31 | 32 | 42 | 104 | 28 | 31 | 40 |
| Th (ppm) | 202 | 94 | 90 | 121 | 195 | 61 | 65 | 109 | n.d. = not detected

TABLE 4

EFFECT OF WASH AND EFFECT OF SECOND STAGE SULFURIC ACID LEACH

| Components | 3 | 4A | 4B | 4C |
|---|---|---|---|---|
| $TiO_2$ (%) | 89.0 | 82.5 | 86.65 | 92.9 |
| $Fe_2O_3$ (%) | 4.40 | 7.71 | 4.57 | 1.36 |
| $Al_2O_3$ (%) | 0.38 | 0.99 | 0.87 | 0.16 |
| $SiO_2$ (%) | 2.25 | 1.63 | 2.59 | 1.52 |
| $P_2O_5$ (%) | 0.46 | 1.58 | 0.06 | 0.12 |
| MnO (%) | 0.16 | 0.26 | 0.17 | 0.11 |
| $ZrO_2$ (%) | 1.12 | 0.96 | 0.64 | 0.98 |
| $V_2O_5$ (%) | 0.37 | 0.07 | n.d. | 0.38 |
| CaO (%) | 0.06 | 0.12 | 0.06 | 0.04 |
| SrO (%) | — | 0.07 | 0.03 | 0.04 |
| BaO (%) | — | 0.22 | 0.19 | 0.26 |
| Rare Earths (%) | 0.12 | 0.36 | 0.06 | 0.19 |
| U (ppm) | 50 | 80 | 18 | 40 |
| Th (ppm) | 47 | 113 | 32 | 37 | n.d. = not detected

We claim:

1. A process for beneficiating a naturally occurring anatase titaniferous ore or a naturally occurring anatase titaniferous ore body comprising a blend of anatase ore with ilmenite ore comprising:
   (a) leaching the titaniferous ore or the titaniferous ore body with sulfuric acid at a temperature of at least 110° C. to form a leached ore and a liquid phase;
   (b) calcining the leached ore in the presence of oxygen or in the presence of an oxygen-containing gas at a temperature of greater than 800° C. to form a calcined ore; and
   (c) leaching the calcined ore with an acid selected from the group consisting of sulfuric acid, hydrochloric acid, nitric acid, and mixtures thereof to form a beneficiated ore.

2. The process of claim 1 wherein the sulfuric acid of step (a) is primarily obtained from a waste stream and/or a recycle stream.

3. The process of claim 1 wherein the leaching of the titaniferous ore in step (a) occurs at a pressure of at least 10 psig.

4. The process of claim 1 wherein the leaching of the calcined ore in step (c) occurs at a pressure of at least 10 psig and the acid is sulfuric acid.

5. The process of claim 4, wherein the leaching of the calcined ore in step (c) occurs at a temperature of at least 110° C.

6. The process of claim 1 wherein the sulfuric acid of step (a) has a concentration of 5% to 65% by weight.

7. The process of claim 1 further comprising separating the leached ore from the liquid phase, wherein the liquid phase comprises mother liquor, which comprises sulfuric acid and metallic salts, and fines which comprise $TiO(OH)_2$, metallic salts, and metallic hydrates.

8. The process of claim 7 further comprising separating the mother liquor from the fines and using the fines as a feedstock for a sulfate pigment plant or a catalyst process.

9. The process of claim 8 further comprising crystallizing the metallic salts from the mother liquor and reconcentrating the sulfuric acid.

10. The process of claim 9 further comprising recycling the reconcentrated acid to leaching step (a).

11. The process of claim 1 comprising calcining the leached ore at a temperature from 90° C to 1100° C.

12. The process of claim 1 comprising calcining the leached ore at a first temperature greater than 800° C. and then heating to a second temperature greater than the first temperature.

13. The process of claim 1 further comprising adding to the leached ore of step (a) from 0.1 wt percent to 15 wt percent, based on the leached ore weight, of a chemical additive selected from the group consisting of NaCl, NaOH, $Na_2CO_3$, KCl, KOH, $K_2CO_3$ and mixtures thereof whereby the chemical additive penetrates into the leached ore.

14. The process of claim 1 further comprising contacting the calcined ore from step (b) with water prior to leaching step (c).

15. The process of claim 13 wherein the chemical additive is NaCl.

16. The process of claim 1 wherein the naturally occurring anatase titaniferous ore body comprises a blend of anatase ore with 30 wt percent ilmenite.

* * * * *

UNITED STATES PATENT AND TRADEMARK OFFICE
CERTIFICATE OF CORRECTION

PATENT NO. : 7,625,536 B2  Page 1 of 1
APPLICATION NO. : 11/252407
DATED : December 1, 2009
INVENTOR(S) : Earl M. Smith, Jr. and Andrea de Castro Sheldon It is certified that error appears in the above-identified patent and that said Letters Patent is hereby corrected as shown below:

In the Specification:
Column 1, line 54: After "levels of" delete "Is"

In the Claims:
Column 13, line 20: Delete "90° C" and replace with -- 900° C --

Column 14, line 8: Delete "NaCI," and replace with -- NaCl --

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,625,536 B2 Page 1 of 1
APPLICATION NO. : 11/252407
DATED : December 1, 2009
INVENTOR(S) : Smith, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-first Day of December, 2010

David J. Kappos
*Director of the United States Patent and Trademark Office*